United States Patent [19]

Andersson

[11] Patent Number: 4,606,786
[45] Date of Patent: Aug. 19, 1986

[54] ARRANGEMENT FOR ULTRASONIC SEALING

[75] Inventor: Pär Andersson, Lund, Sweden

[73] Assignee: Tetra Pak International AB, Lund, Sweden

[21] Appl. No.: 681,592

[22] Filed: Dec. 14, 1984

[30] Foreign Application Priority Data

Jan. 2, 1984 [SE] Sweden .............................. 8400009

[51] Int. Cl.$^4$ ............................................. B29C 65/08
[52] U.S. Cl. ................................ 156/580.1; 156/73.1; 156/580.2; 228/1.1; 264/23; 425/174.2
[58] Field of Search ................ 156/73.1, 580.1, 580.2, 156/580, 583.1; 264/23; 425/174.2; 100/46, 93 P, 257, 258 A; 228/1.1

[56] References Cited

U.S. PATENT DOCUMENTS

| | | | |
|---|---|---|---|
| 3,431,593 | 3/1969 | Miller | 425/174.2 |
| 3,647,599 | 3/1972 | Gardner | 156/580.1 |
| 3,683,470 | 8/1972 | McMaster et al. | 156/73.1 |

Primary Examiner—Michael Wityshyn
Attorney, Agent, or Firm—Burns, Doane, Swecker & Mathis

[57] ABSTRACT

An arrangements for ultrasonic sealing comprises a sealing jaw which is combined with an ultrasonics source and a counterjaw. During the sealing the parts which are to be sealed to each other are pressed together between working surfaces of the jaws with simultaneous activation of the ultrasonics source as a result of which the parts are welded together. In the sealing of thin material layers it is very difficult to obtain a uniform compression over the whole surface which means that the risk of burning asunder or unsatisfactory sealing increases. In the invention this is prevented with the help of supporting elements which engage with two stop faces located in the nodal plane of the sealing jaw and on the one hand determine the minimum distance between the working surface, and on the other hand orientate the flexibly suspended jaw so that the working surfaces are parallel.

8 Claims, 4 Drawing Figures

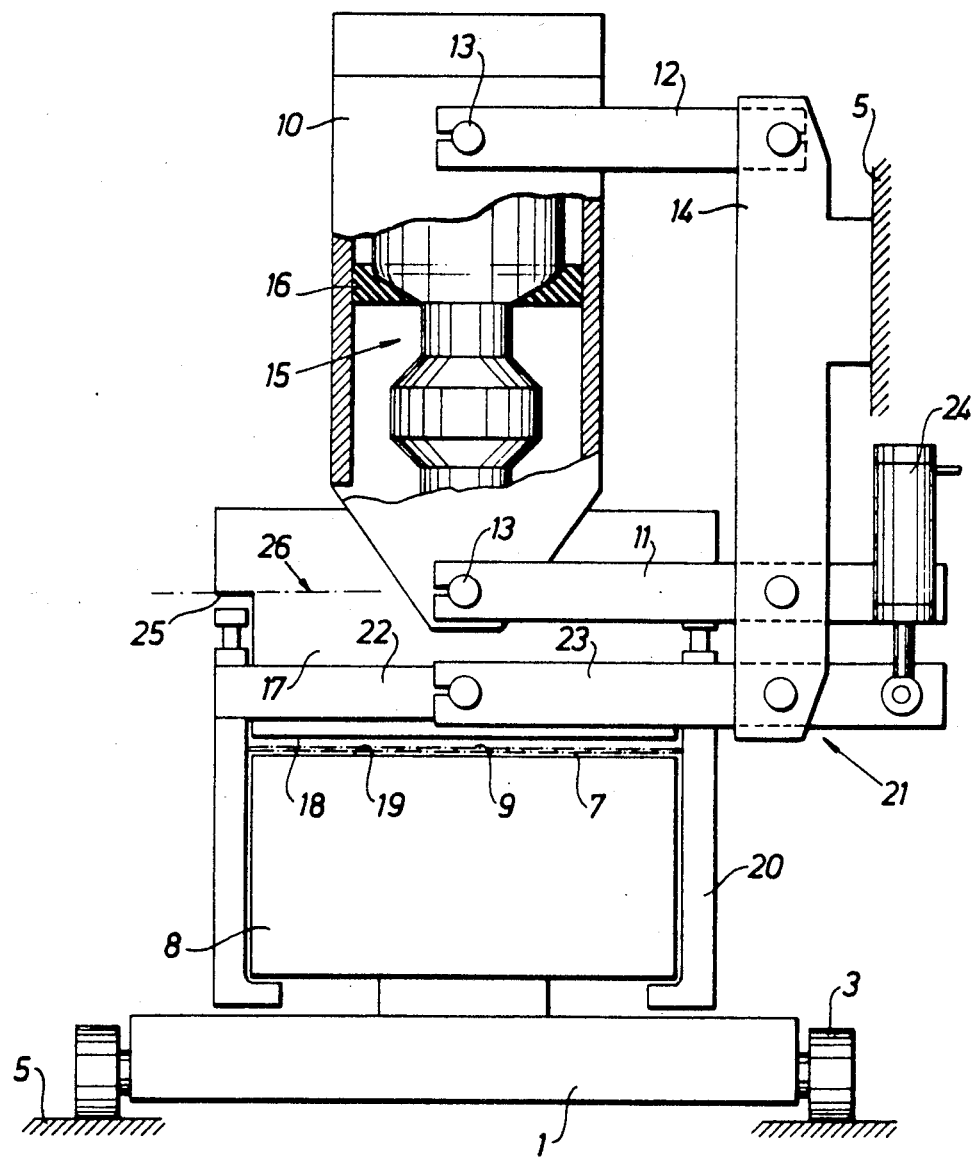

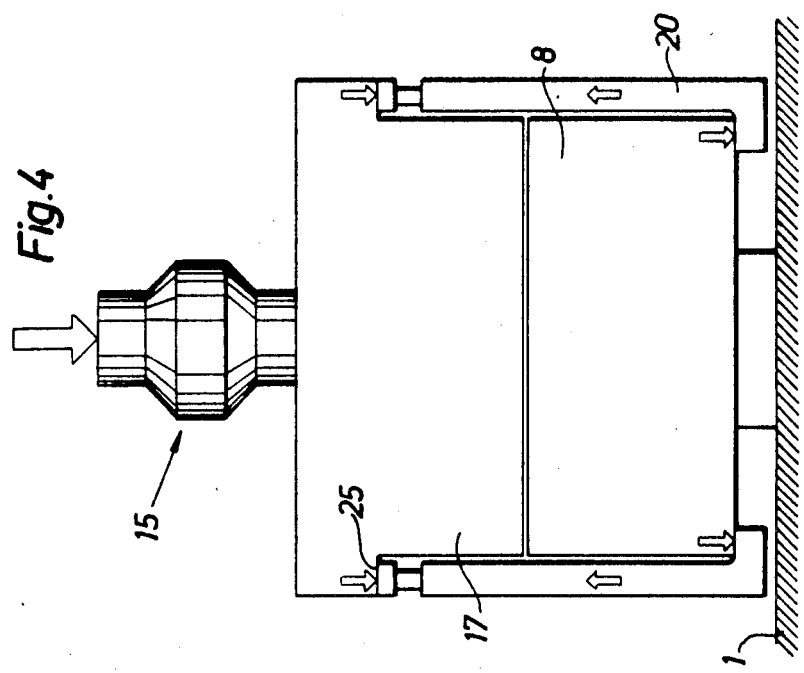
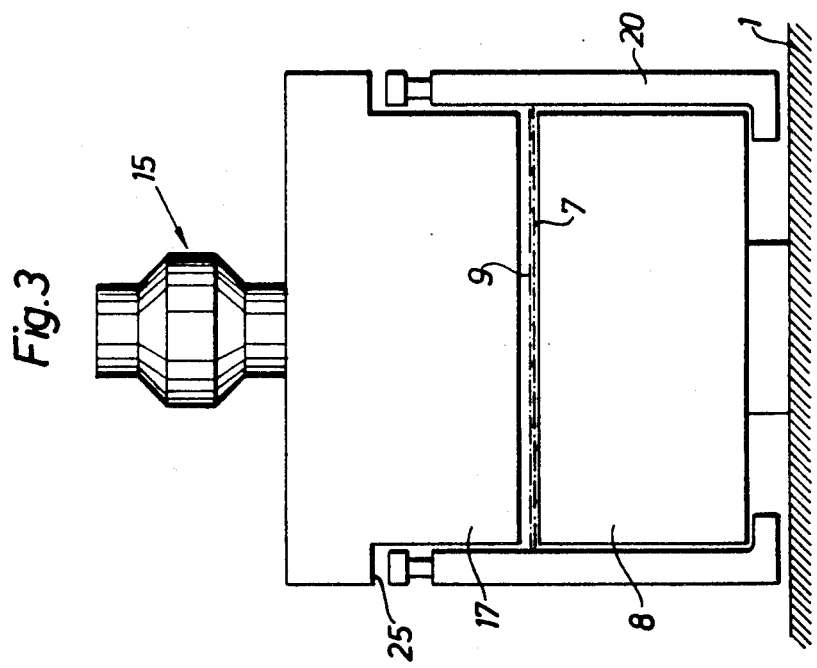

ARRANGEMENT FOR ULTRASONIC SEALING

BACKGROUND AND SUMMARY OF THE INVENTION

The present invention relates to an arrangement adapted to provide in ultrasonic sealing by means of a sealing jaw and a counterjaw a working gap of predetermined dimension between the working surfaces of the jaws.

In the packaging industry thermoplastic material is frequently used for the manufacture of packing containers of the non-returnable type, e.g. packages for milk or other liquid dairy products. The packing material is in the form of sheets or webs and usually comprises several layers, e.g. a central carrier layer of fibrous material, e.g. paper, imparting rigidity and layers of liquid-tight, thermoplastic material applied to either side of it. The liquid-absorbing properties of the fibrous carrier layer can be a disadvantage in certain cases, and this layer is sometimes replaced therefore in modern packing laminates by a layer of foamed thermoplastic material which serves as a spacer between the two homogeneous surface layers and thereby imparts great rigidity to the packing material in relation to the total weight.

The conversion of the packing laminate to liquid-filled individual packing containers usually takes place in steps in that one or more material webs are converted by means of different types or processing, e.g. cutting, folding, thermoforming and sealing to a material tube consisting of coherent packing container blanks. During the forming work the material tube preferably moves more or less vertically downwards through the packing machine and is filled in the process continuously with contents to a predetermined level. At the same time a transverse sealing, repeated at equal intervals, takes place at the lower end of the material tube, which divides the tube into individual, liquid-tight packing containers. The packing containers are severed from one another by cutting through the transverse sealing zones and after possible further form-processing or other treatment they are ready to be transported away to storage or sales points.

During the forming work, the material web as mentioned earlier, is sealed on several occasions to itself or to other material webs. The demands on these seals are great both in respect of strength and of liquid-tightness and it has proved appropriate, therefore, to carry them out with the help of heat sealing. In this process the thermoplastic packing laminate layers are heated with simultaneous or subsequent compression to such a temperature that they soften or fuse together thus giving a homogeneous seal with good properties, well suited for the purpose. The heat sealing can be realized either with the help of heat generated outside the packing laminate, e.g. through convection from surrounding heat sources, or through heat which is generated directly in the packing laminate, e.g. through microwave energy. The latter method is used to an increasing extent and has been found to be particularly appropriate to be used when the transverse seals mentioned earlier are to be accomplished. In this sealing work the laminate layers forming the packing material tube must be compressed first whilst displacing at the same time any contents present between them, whereupon the thermoplastic layers in the sealing zone can be united by heating them to melting temperature. Especially in the manufacture of larger types of packing containers with a volume of 1 liter or more the material tube must be of such a size that the length of the transverse seal will be realtively great, e.g. 200 mm. At the same time the seal width amounts to not more than a few millimetres. The great length of the seal creates problems in the sealing work, since even a very slight angular deviation of one of the sealing jaws between which the material is compressed during the sealing work brings about an uneven sealing quality which appreciably increases the danger of leakage. These difficulties moreover clearly increase in ultrasonic sealing of wholly plastic laminate, that is to say packing laminate which lacks a carrier layer of fibrous material. This type of packing laminate instead has a central layer of foamed plastic material which in heated condition offers little or no resistance when the laminate layers are pressed together by the sealing jaws. In ultrasonic sealing the jaws are pressed against each other continuously during the sealing process with a predetermined force whilst the energy transmission is controlled. Since the energy transmission in ultrasonic sealing is directly proportional to the sealing pressure any possible angular deviation of the sealing jaw means that the sealing pressure will be unevenly distributed over the length of the sealing jaw, with all of the ultrasonic energy being conducted to that part of the sealing region where the gap between the sealing jaws is smallest. This means, though, that the material is fully burnt through in this region while no sealing whatever takes place at the opposite end of the sealing jaw. In order to overcome these disadvantages up to now in that very small manufacturing tolerances and high demands on accuracy have been specified in respect of sealing jaws and associated elements. The maximum permissible deviation in parallelism between the working surfaces of the jaws e.g. is 0.05 mm which is extraordinarily small in a jaw length of up to 200 mm. Obviously this gives rise to difficulties as well as to high costs in the manufacture of the parts concerned and during a prolonged period in practical use there is reason to fear, moreover, that the demand for accuracy cannot be maintained because of the wear occurring, which evidently results in varying sealing quality and a high requirement of service.

It is generally desirable therefore to provide an arrangement for ultrasonic sealing, this arrangement being not sensitive to angular deviations between the jaws or thickness variations of the material layers which are to be sealed together.

It is an object of the present invention, therefore, to provide such an arrangement which is particularly suitable for ultrasonic sealing in the packaging industry where comparatively thin theremoplastic material is often provided with relatively long seals and where the demands on the quality and liquid-tightness of the seal are extremely high.

It is a further object of the present invention to provide an arrangement for ultrasonic sealing, which is not subject to the disadvantages of earlier known similar arrangements and which is capable of being manufactured in an uncomplicated manner at reasonable costs.

It is a further object of the present invention finally to provide an arrangement for ultrasonic sealing, which is not very complicated and well adapted for use in modern machines for the manufacture of liquid-filled packing containers.

These and other objects have been achieved in accordance with the invention in that an arrangement adapted to provide in ultrasonic sealing, by means of a sealing jaw and a counterjaw, a working gap of predetermined dimension located between the working surfaces of the jaws has been given the characteristic that supporting elements are arranged to determine the minimum distance between the working surfaces of the jaws, these supporting elements in the working position of the working jaw resting against a stop face formed in the nodal plane of the working jaw.

By making use of supporting elements which limit the working movement and define the gap width, a uniform heating and a seal of good quality are obtained without the supply of energy having to be monitored or controlled which means that an appreciable simplification of the sealing equipment is made possible. The direct contact of the supporting elements against the working jaw in practice eliminates the risk of any play or flexibilities which are present or arise in the sealing equipment as well as in the surrounding elements and which negatively affect the gap width, critical for the sealing result, between the working surfaces of the jaws. The use of two or more stop faces on the sealing jaw and the flexible suspension of the counterjaw make it possible fully to disengage the normal driving and control arrangement of the jaws during the important end phase of the sealing work proper which means that inaccuracies in these components wholly lack the opportunity of influencing the sealing result.

The arrangement in accordance with the invention, on being used in packing machines for the manufacture of liquid-filled non-returnable packages has proved to bring about such an improvement that it has become possible only now to make use of ultrasonic sealing with sufficient operational safety and accuracy on greater sealing lengths.

BRIEF DESCRIPTION OF THE DRAWINGS

A preferred embodiment of the arrangement in accordance with the invention will now be described in more detail with special reference to the attached schematic drawings which for reasons of clearness only show the parts of the arrangement and surrounding elements which are essential for a good comprehension of the concept of the invention.

FIG. 2 shows the arrangement in accordance with FIG. 1 from the side and partly in section.

FIG. 3 shows schematically and partly in section the material-processing components of the arrangement in accordance with FIG. 2 in the position they are in prior to the actual sealing work.

FIG. 4 corresponds to FIG. 3 but shows the components in the position they are in during the end phase of the sealing work.

DETAILED DESCRIPTION OF THE PREFERRED EMBODIMENT

Figure 1:
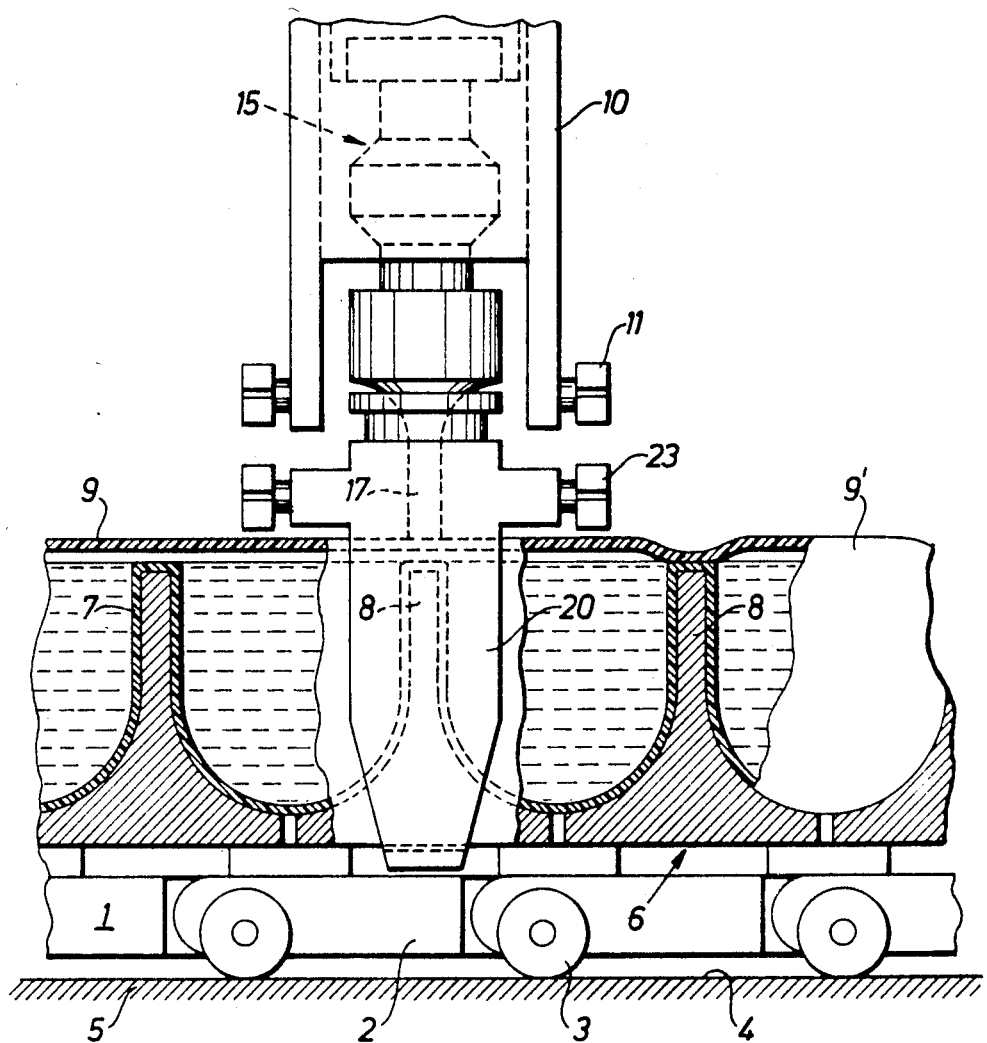
FIG. 1 shows the arrangement in accordance with the invention from the front.

The arrangement in accordance with the invention shown in FIG. 1 is intended for ultrasonic sealing of thermoplastic material in the manufacture of packing containers with the help of a machine of the type described comprehensively in Swedish patent No. 7400444-1. The machine is thus of a known type and any more detailed description of parts or function of the packing machine as such is not required in this context. Quite briefly it should be mentioned, however, that during operation the packing machine successively converts two plane packing material webs to individual, filled packing containers through cutting, thermoforming and thermosealing. The packing material used for this purpose is a laminate of the type which comprises a central carrier layer of foamed plasic material, e.g. polystyrene, and two homogeneous thermoplastic layers applied to either side of it which may also consist of polystyrene. The two homogeneous layers have a thickness of approx. 0.1 mm while the thickness of the central foam layer is approx. 1 mm. Owing to this design the two homogeneous plastic layers will be at a relatively great distance from each other which imparts a very good rigidity to the packing laminate in relation to the weight. The packing laminate may also comprise layers of suitable gas barrier material, e.g. aluminium foil which can be appropriate if packing containers, which impart prolonged keeping properties to the contents, are to be manufactured. Apart from any layers of aluminium foil which may be included, the other layers of the laminate are of the thermoplastic type which makes possible the conversion of the packing laminate webs to the desired shape and the sealing of the laminate webs to themselves or to each other with the help of heat and pressure.

In the packing machine described in the Swedish patent the two material webs are successively formed and sealed while moving through the packing machine to an elongated profiled pipe or tube which consists of a series of coherent, almost finished packing containers. Along one side of the packing containers there is a longitudinal connecting duct wherein is located a filling pipe to make possible the continuous feed of contents to the individual packing containers passing by. After a packing container has been filled with contents it moves past the opening end of the filling pipe whereupon the said duct is closed by means of transverse sealing together of the two packing material webs between the individually formed packing containers. Subsequently a cutting in the transverse sealing area follows so that the packing containers can be separated from each other and e.g. be packed in collective packages for further transport to sale and consumption.

The transverse sealing together of the two almost finished packing material webs is relatively difficult to carry out since it has to be achieved in the presence of a greater or smaller amount of contents between the packing laminates which are to be sealed to each other. Nevertheless, high demands are made on the durability and liquid-tightness of the seal, and it has not always been possible up to now to obtain the desired high quality of join with the help of existing equipment for ultrasonic sealing. The reason for this has proved to be first and foremost that the parts of the machine which in the course of the sealing are adapted to process the packing laminate, after a certain period of operation, no longer work with the high degree of precision which is required for satisfactory ultrasonic sealing. The arrangement in accordance with the invention has been developed above all in order to overcome these disadvantages but the arrangement is usable, of course, universally in a number of other types of sealing work with the help of ultrasonics.

The preferred embodiment of the arrangement in accordance with the invention which is intended to be used on a packing machine of the type which is described in Swedish patent No. 7400444-1 is illustrated in greater detail in the figures, and in FIG. 1 is shown also a part of a mould chain 1 which is an important part of the packing machine. The mould chain 1 comprises a number of chain segments 2 in hinged connection which with the help of supporting wheels 3 can be displaced along a track 4 on a machine stand 5. The chain 1 is of the endless type and is driven at constant speed around the machine with the help of a motor and gear arrangement (not shown). Each chain segment 2 carries a so-called mould half 6 whose contour corresponds to the shape of the packing container which is to be manufactured. Two mould halves 6 situated next to each other between them form a recess wherein a first packing laminate web 7 with the help of heat and moulding elements is made to form a curved packing container wall. The forming process is described in more detail in the said Swedish patent application to which reference is made. The mould halves 6 have projecting wall-shaped elements which hereinafter will be called counterjaws 8. The reason for this will be explained in more detail in the following. The packing laminate web 7 mentioned earlier passes over the counterjaws 8. Adjoining the same extends a second packing laminate web 9 substantially rectilinearly between the counterjaws. The longitudinal edges of the packing material web 9 have tabs 9' projecting in lateral direction which after folding down and sealing are intended to form opposite walls in the finished packing containers (shown to the right in FIG. 1).

The ultrasonic sealing arrangement in accordance with the invention is situated, as can be seen especially in FIG. 1 and FIG. 2, directly adjoining the mould chain 1 provided with mould halves 6 in the packing machine and more particularly in the vicinity of the part of the mould chain where the finished and filled packing container is removed. The arrangement for ultrasonic sealing comprises an ultrasonic casing 10, which is supported in the machine stand 5 so as to be movable by means of a steering arm system (FIG. 2). The ultrasonic casing 10, more particularly, is parallelogram suspended with the help of upper lever arms 11 and a pair of auxiliary lever arms 12 which are all connected to pivots 13 projecting from the ultrasonic casing 10. The opposite ends of the lever arms are in hinged connection at the upper and lower end respectively of a bracket 14 which is rigidly connected to the machine stand 5, and the ultrasonic casing 10 is thus parallel displaceable in upwards and downwards direction in FIGS. 1 and 2.

In the ultrasonic casing is an ultrasonic unit 15 which is flexibly suspended by means of the rubber fastening 16. At the lower end of the ultrasonic unit 15 there is an ultrasonic horn or sealing jaw 17. The working surface 18 of the sealing jaw 17 is located directly above a corresponding working surface 19 on the counterjaw 8 which at the moment is in line with the ultrasonic unit. The two working surfaces 18, 19 are plane and substantially mutually parallel, and the distance between them in inactive position of the unit is approximately twice the thickness of the two material layers which are to be sealed to each other, that is to say in the case described approx. 5 mm. The chain 1 with the mould halves 6 can thus move without hindrance under the sealing jaw 17.

On either side of the mould halves 6 or more particularly the counterjaw 8, which at the moment is on a level with the ultrasonic sealing arrangement in accordance with the invention, there are hooked elements 20 which are movable and constitute a part of a supporting element 21. The two hooked elements 20 are rigidly connected with each other by means of a transverse frame 22 and are as such a distance from the sealing jaw 17 as well as from the counterjaws 8 that these can pass the hooked elements freely with a certain play during the movement of the mould chain 1. The frame 22 is connected pivotably with the lower lever arms 23 which like the upperlever arms 11 and the auxiliary lever arms 12 are supported so that they can pivot in the bracket 14. Between the lower lever arms 23 and the upper lever arms 11 there is a manoeuvring cylinder 24 which in operation pivots the lower and upper lever arms 23, 11 respectively in opposite directions. In the process the sealing jaw 17 and the counterjaw 8 are moved towards each other which will be explained in more detail in the following.

The upper end surfaces of the hooked elements 20 are adapted so that in active position they engage with two stop faces 25 which are arranged on either side of the sealing jaw 17. Since the engagement between the hooked elements 20 and the said stop faces 25 is intended to limit the length of the working movement of the sealing jaw 17 during operation, special measures have to be adopted to prevent the kinetic energy in the jaw 17 generated by the ultrasonic unit 15 from causing any harmful heating of the two stop faces between the hooks 20 and the jaw 17. It has been found that this can be prevented if the stop face 25 is placed with high precision just at the point in the sealing jaw 17 (ultrasonic horn) where the nodal plane of the ultrasonic vibrations is situated. At this point the amplitude of the ultrasonic vibration is zero and no transmission of energy will thus take place. In practice, the plane wherein the amplitude is zero, is somewhat curved which makes it difficult to place and form the surfaces 25 in exactly the correct manner. A certain tolerance has to be accepted therefore which during prolonged operation may lead to a slight heating (20°-30° C.) of the stop faces. The heating is in no way harmful and the energy loss is small and can therefore be accepted.

During operation of the packing machine and the arrangement in accordance with the invention installed therein the mould chain 1 is moved stepwise from left to right in FIG. 1. As a result the two packing laminate webs 7, 9 are fed at the same rate between the mould chain 1 and the ultrasonic sealing arrangement in accordance with the invention located at a little distance above it. Through the effect of heat and pressure, the one packing laminate web 7 previously has been given a repeated U-shape which coincides with the shape of the intervals formed between the mould halves 6. The central part of the second packing material web 9 is substantially plane and extends at some distance above the parts of the tabs 9' projecting in lateral direction are folded down against, and sealed to, the longitudinal side edges of the material web 7. Between the two packing laminate webs 7, 9 there is a filling pipe (not visible in the figures) the outlet end of which is at some distance to the left (FIG. 1) of the ultrasonic sealing arrangement in accordance with the invention. The partly finished packing containers arriving under the ultrasonic sealing arrangement have thus already passed the outlet opening of the filling pipe and are wholly or partly filled therefore with the desired contents. The remaining connection between the packing containers is now broken with the help of the ultrasonic sealing arrangement in accordance with the invention in that the two packing laminate webs 7, 9 are pressed against each other and sealed to each other in the region located above each counterjaw so that a transverse, liquid-tight seal extending over the packing material tube consisting of the coherent packing containers is achieved.

The realization of an individual transverse seal occurs in the following manner. After the mould chain 1 with filled, partly finished packing containers have been fed into such a position that the particular counterjaw 8 is just opposite the sealing jaw 17 the relative movement between the jaws comes to a standstill so that these stop in relation to each other. This may be done either in that the feed movement of the mould chain ceases or in that the ultrasonic sealing arrangement is moved in the same direction and at the same speed as the mould chain. When this is the case the manoeuvring cylinder 24 is activated so that the piston rod moves outwards (FIG. 3) which means, because of the attachment of the cylinder or the piston rod in the upper and the lower lever arm 11, 23 respectively that their rear ends are displaced from each other. Owing to the pivotable suspension of the lever arms in the bracket 14 their opposite ends will be moved in direction towards each other. At this the lever arms 11 act upon the ultrasonic casing 10 so that it is displaced vertically downwards at the same time as the lower lever arm 23 raises the frame 22 with the two hooked elements 20 in an upwards direction. On this happening the play between the parts located at the lower ends of the hooked elements 20, extending in under the counterjaw 8, and the lower surface of the counterjaw will be diminished until the hooked elements 20 rest against the lower surface of the counterjaw 8. In the continued movement upwards of the hooked elements 20 the counterjaw will follow therefore while the particular chain segment 2, because of its flexible fastening in the adjoining chain segment, will be lifted and join in the movement. The ultrasonic unit 15 is now activated so that the ultrasonic horn functioning as a sealing jaw 17 commences to vibrate, and when on continued movement of the jaws the packing laminate webs 7, 9 located between the two jaws 8, 17 are squeezed between the working surfaces 18, 19 of the jaws the vibrations are transmitted to the thermoplastic laminate materials so that these are heated and very quickly reach a temperature suitable for sealing. Since the parallelism between the working surfaces 18, 19 of the jaws is unlikely to be wholly perfect on many occasions a higher pressure will arise at one or the other end of the gap and this means that the packing material is pressed together and compressed more strongly at that end. Since in ultrasonic sealing the energy transmission is proportional to the sealing pressure the energy transmission will be higher at that particular end and the material will melt therefore more rapidly in this region. Hence, the hooked element 20 located at this end will, with its upper end surface, reach the stop face 25 on the sealing jaw 17 before the hooked element located on the opposite side of the jaws. As soon as a hooked element has made contact with one stop face 25 of the sealing jaw 17 the end parts corresponding to the two sealing jaws 8, 17 can no longer move towards each other which means that no further pressing together of the packing laminate can take place in this particular region. However, owing to the engagement between the upper end surface of the one hooked element 20 and the stop face 25 a rotating moment is produced around the engagement point which owing to the flexible suspension of the counterjaw 8 as well as of the sealing jaw 17 has the effect that either one or the other or both of the sealing jaws are rotated until the hooked element 20 located at the opposite side also makes contact with the respective stop face 25 on the sealing jaw 17 (FIG. 4). During the rotating movement of both sealing jaws the sealing pressure caused by the manoeuvring cylinder 24 is distributed along the whole length of the gap so that the energy transmission "migrates" in the direction of the opposite end of the gap with simultaneous heating and pressing together of the two laminate layers to the thickness which is determined by the gap width defined by means of the engagement of the hooked elements 20 with the stop faces 25 and preferably amounting to approx. 10% of the original thickness of the combined laminates.

After the sealing movement of the two jaws 8, 17 has thus been interrupted through the engagement of the hooked elements 20 with the stop faces 25 the ultrasonic supply ceases. The pressure generated by the manoeuvring cylinder 24 is further maintained for a while though so that the compressed heated part of the packing laminates 7, 9 have an opportunity of cooling during continued compression which ensures that the seal accomplished will be of good quality. After a suitable cooling period the manoeuvring cylinder 24 is acted on so that its piston rod is drawn into the cylinder again e.g. by means of the force of a spring which via the lever arms 11, 23 influences the ultrasonic casing 10 and frame 22 respectively so that the ultrasonic casing is raised and the frame is lowered until the supporting wheels 3 rest again on the track 4 of the stand 5 and the lower ends of the hooked elements 20 are at an appropriate distance from the lower surface of the counterjaw 8. The seal between the two packing laminate layers 7, 9 is now completed and the mould chain 1 can be displaced again relatively to the ultrasonic sealing arrangement until the subsequent counterjaw 8 is right opposite the sealing jaw 17, whereupon the procedure is repeated. The finished, liquid-tight detached packing containers are then separated from one another in a subsequent stage with the help of a cutting unit (not shown) which is at some distance to the right of the ultrasonic sealing arrangement (FIG. 1). With the help of the cutting unit the packing containers are cut off from one another by means of a cut in the sealed region whereupon the individual packing containers are removed from the recess in the mould chain 1 and conveyed further for any subsequent processing or packing in collective containers.

Through the flexible suspension of the two sealing jaws 8, 17 and the presence of the supporting element 21 a number of advantages are obtained by comparison with ultrasonic sealing arrangements known earlier. The design of previous sealing arrangements implied that the sealing result was wholly dependent on the precision and accuracy of manufacture of the relevant machine parts. Moreover, wear and other inaccuracies arising during the period of operation had a direct effect upon the gap width between the working surfaces of the two jaws which meant that close adjustments were necessary to ensure an acceptable seal of uniform quality over the whole width of the jaws. The design in accordance with the invention completely eliminates these difficulties through the complete disengagement of the relevant machine parts so that they do not affect in any manner the width of gap during the actual sealing process. This is done in that the control of the two jaws during the sealing process is taken over wholly by the supporting element 21 so that the wear which unavoidably above all affects the supporting wheels 3 and the chain 1 during prolonged operation of the machine is not permitted to influence the sealing result. Through the direct contact between the hooked elements 20 controlling the counterjaw 8 and the stop faces 25 in the nodal plane of the sealing jaw 17, any effect owing to the installation of the ultrasonic unit 15 in the ultrasonic casing 10 is also prevented, since the ultrasonic unit 15 owing to its suspension by means of the rubber fastening 16 in the casing 10 can be fully controlled by the contact against the hooked elements 20. This direct action between the ultrasonic horn serving as sealing jaw 17 and the counterjaw is unique, since it was considered not possible previously to bring any form of supporting element into contact with the ultrasonic horn while the same is activated because of the characteristic of the ultrasonic energy, mentioned earlier, of being proportional to the pressure. Practical experiments have shown, however, that by accurate calculation and forming of the stop faces 25 in the nodal plane of the ultrasonic horn it is possible to avoid completely any harmful heating at these points which indicates that in principle the whole energy transmission continues to take place at the working surfaces. No appreciable wear of the stop faces 25 or the surfaces corresponding to the hooked elements 20 has been observed either, in spite of extended experiments.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Accordingly, variations and changes may be made by those skilled in the art without departing from the present invention, as set forth in the appended claims.

What is claimed is:

1. An arrangement for ultrasonic sealing of laminates by means of a sealing jaw and a counterjaw with a working gap of predetermined dimension between the working surfaces of the jaws, comprising supporting means for supporting said sealing jaw and counterjaw for relative movement toward and away from each other, stop means for maintaining a predetermined minimum distance between working surfaces of the jaws, the stop means including stop members on the counterjaw arranged when in a working position of the sealing jaw to rest against a stop face formed in the nodal plane of the sealing jaw, whereby the working surfaces are maintained parallel to each other.

2. An arrangement in accordance with claim 1, wherein the counterjaw and the supporting means include supporting elements which are movably suspended, the supporting elements being maneuverable between a rest position out of engagement with the sealing jaw and the counterjaw and a working position wherein the supporting elements sustain the counterjaw and limit the sealing jaw working stroke by means of contact against the stop face in the nodal plane of the sealing jaw.

3. An arrangement in accordance with claim 1, wherein the sealing jaw and counterjaw have substantially linear, elongated working surfaces and the stop members engage said stop face at each end of the working surface.

4. An arrangement in accordance with claim 3, wherein the counterjaw is pivotally suspended so that on contact with the supporting elements the counterjaw is rotated to an angular position where the working surfaces of the jaws are mutually parallel.

5. An arrangement in accordance with claim 1, wherein the minimum distance between the working surfaces of the jaws is approximately 10% of the combined original thickness of the laminates which are to be sealed to each other.

6. An arrangement in accordance with claim 1, including conveyor means extending transversely of the direction of movement of said sealing jaw, said conveyor means having said counterjaw mounted thereon, said supporting means including means for moving said counterjaw relative to said conveyor means, whereby a series of said counterjaw on said conveyor means cooperate with said sealing jaw in sequence to provide multiple sealing operations.

7. An arrangement for ultrasonic sealing of laiminates by means of a sealing jaw and a counterjaw with a working gap of predetermined dimension between the working surfaces of the jaws, comprising supporting elements arranged to determine a minimum distance between working surfaces of the jaws, the supporting elements in a working position of the sealing jaw resting against a stop face formed in the nodal plane of the sealing jaw, said supporting elements include hooked elements located at opposite sides of the counterjaw so as to drive the counterjaw in a movement in the direction opposite to the working stroke of the sealing jaw.

8. An arrangement in accordance with claim 7, wherein the counterjaw is movable along a track extending at an angle to the working movement and is raisable from the track by means of the supporting elements when the counterjaw is situated opposite the sealing jaw.

* * * * *